United States Patent
Muller

(10) Patent No.: US 12,203,249 B2
(45) Date of Patent: Jan. 21, 2025

(54) BUFFER FOR STORING LIQUID AT A CONSUMER PRESSURE

(71) Applicant: Airbus Operations GmbH, Hamburg (DE)

(72) Inventor: Hannes Muller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 42 days.

(21) Appl. No.: 18/182,045

(22) Filed: Mar. 10, 2023

(65) Prior Publication Data

US 2023/0287665 A1 Sep. 14, 2023

(30) Foreign Application Priority Data

Mar. 11, 2022 (EP) .................................. 22161620

(51) Int. Cl.
*E03B 7/07* (2006.01)
*B64D 11/02* (2006.01)
*G05D 16/20* (2006.01)

(52) U.S. Cl.
CPC .............. *E03B 7/075* (2013.01); *B64D 11/02* (2013.01); *G05D 16/2066* (2013.01)

(58) Field of Classification Search
CPC . E03B 7/075; E03B 7/078; E03B 7/08; E03B 11/00; E03B 11/06; B64D 11/02; B64D 11/04; G05D 16/2066
See application file for complete search history.

(56) References Cited

U.S. PATENT DOCUMENTS

| | | | |
|---|---|---|---|
| 4,063,315 A | 12/1977 | Carolan | |
| 4,428,401 A * | 1/1984 | Chun | F15B 1/08 73/304 C |
| 4,576,552 A * | 3/1986 | Smith | F04D 15/0218 417/32 |
| 4,638,838 A * | 1/1987 | Richard | F15B 1/08 181/227 |
| 5,526,795 A * | 6/1996 | Thompson | F02M 37/12 222/389 |
| 2007/0056649 A1 | 3/2007 | Chang | |
| 2017/0130728 A1* | 5/2017 | Liu | G05D 16/2066 |

FOREIGN PATENT DOCUMENTS

| | | |
|---|---|---|
| CN | 106223416 A | 12/2016 |
| CN | 108316395 A | 7/2018 |
| WO | 2011116285 A2 | 9/2011 |

OTHER PUBLICATIONS

European Search Report for Application No. 22161620, mailed Sep. 6, 2022.

* cited by examiner

*Primary Examiner* — Patrick C Williams
(74) *Attorney, Agent, or Firm* — KDW Firm PLLC

(57) ABSTRACT

A buffer for storing liquid at a consumer pressure includes a storage volume for holding a liquid and a gas. The storage volume may be separated by a partition element into a liquid compartment for holding the liquid and a gas compartment for holding the gas. A pressurizer is configured for increasing the pressure of gas in the storage volume to an operating pressure when liquid is or has been drained from the storage volume. A ventilator reduces the pressure of gas in the storage volume back to the operating pressure when the storage volume is filled with liquid. A water supply system for an aircraft including the buffer and an aircraft including such a water supply system are disclosed.

10 Claims, 2 Drawing Sheets

BUFFER FOR STORING LIQUID AT A CONSUMER PRESSURE

TECHNICAL FIELD

The disclosure herein is directed to a buffer for storing liquid at a consumer pressure exceeding environmental pressure. The disclosure herein is further directed to a water supply system for an aircraft comprising a buffer and an aircraft comprising a water supply system with a buffer.

BACKGROUND

EP 3 385 163 A1 discloses an aircraft with a high-pressure water supply and distribution system. The supply and distribution system comprises a water storage tank, at least one pressurizer and at least one piece of consumer equipment. A conduit system supplies water from the water storage tank via the pressurizer to the consumer equipment. The conduit system employs between the pressurizer and the consumer equipment flexible conduits having a maximum internal diameter of 8 mm or less. As compared to existing rigid plumbing, the flexible conduits are significantly easier to install since they do not need to be installed with a constant slope for drainage, require less space and planning and are also less prone to damage caused by water freezing the conduits. Further, the weight of the flexible conduits is also lower.

However, in order to transport water from the central water storage tank to the consumers through the narrow flexible conduits, higher pressures than in conventional water supply systems are typically required. Further, limited flow rates may make it necessary to provide water buffers at the consumer equipment which supply water to the consumer equipment at higher flow rates than provided to the buffers itself.

SUMMARY

It is an object of the disclosure herein to provide a buffer for supplying water to one or more consumer equipment on an aircraft. A further object is to provide a water supply system for an aircraft comprising a buffer and an aircraft comprising a water supply system with a buffer.

The object underlying the disclosure herein is solved by a buffer, a water supply system and an aircraft disclosed herein. Preferred embodiments of the disclosure herein are disclosed herein.

In a first aspect the disclosure herein is direct to a buffer for storing liquid at a consumer pressure exceeding an environmental pressure. The buffer comprises a storage volume for holding the liquid and a gas, a pressurizer for increasing the pressure of gas in the gas compartment and a ventilator for reducing the pressure of gas in the gas compartment. The pressurizer is configured for increasing the pressure of the gas in the storage volume to an operating pressure or maintaining the pressure of the gas in the storage volume at the operating pressure when liquid is or has been drained from the storage volume. The ventilator is configured for reducing the pressure of the gas in the storage volume back to the operating pressure or maintaining the pressure of the gas in the storage volume at the operating pressure when the liquid compartment is filled with liquid.

In other words, the buffer comprises a storage volume for holding both the liquid which shall be provided at the consumer pressure as well as a gas. The interface between gas and liquid in the storage volume can be a free surface or a partition element separating both fluids. A buffer with a partition element is described in more detail in a preferred embodiment. In case no partition element is provided, the interface between the liquid and the gas is a free surface formed by gravity. In this case, the pressure of the gas at the interface of the gas and the liquid is equal and, therefore, the operating pressure and the consumer pressure are also equal.

When the pressure of the gas in the storage volume is increased, the pressure of the liquid also increases. Correspondingly, when the pressure of the liquid is reduced, the pressure of the gas in the storage volume is also reduced. This also implies that when the amount or volume of liquid in the storage volume is reduced by draining liquid out of the storage volume, the volume of the gas in the storage volume increases and the pressure of the gas drops. Hence, the pressure of the liquid in the storage volume also drops. On the other hand, when the storage volume is filled up with liquid, i.e., the amount of water in the storage volume is increased, the volume of the gas in the storage volume is reduced and the pressure of the gas in the storage volume rises which causes the pressure of the liquid in the storage volume to rise.

The buffer is configured to provide liquid, in particular, water, at a consumer pressure which is higher than the environmental pressure, for example, to a consumer equipment such as a rinsing of a toilet in an aircraft lavatory or a faucet. The environmental pressure is the pressure of the air surrounding the buffer. For example, in a vented aircraft on the ground the environmental pressure may be the atmospheric pressure. However, when the aircraft is in flight and the cabin of the aircraft is pressurized, the environmental pressure is the cabin pressure. The consumer pressure may, for example, be 2.8 bar.

The liquid is stored at the consumer pressure in the liquid compartment of the buffer. Since the pressure in the storage volume, i.e., the liquid pressure of the buffer, and the pressure of the gas in the storage volume, i.e., the buffer's gas pressure, are correlated, gas in the storage volume is at an operating pressure when liquid in the storage volume is at the consumer pressure. The operating pressure may, for example, be 2.8 bar.

In order to supply water with a constant pressure, the buffer comprises a pressurizer and a ventilator. The pressurizer is provided for increasing the pressure of gas in the storage volume by pumping additional gas into the storage volume. The pressurizer is configured to increase the pressure in the storage volume, for example, when it drops below the operating pressure or a filling pressure. For example, when liquid is removed from the storage volume of the buffer and the pressure of the gas consequently drops, the pressurizer is activated and increases the gas pressure until it reaches the operating pressure.

On the other hand, when the storage volume of the buffer is filled up with liquid, for example, with water from a high-pressure stage of a high-pressure water supply system, the gas in the storage volume is compressed so that the gas pressure increases and exceeds the operating pressure. In consequence, also the liquid pressure rises above the consumer pressure. To reduce the gas pressure back to operating pressure, the ventilator is provided for venting gas from the storage volume so that the gas pressure in the buffer drops back to the operating pressure which causes the pressure of the liquid to drop also back to the consumer pressure.

The buffer is particularly advantageous for several reasons. First of all, it enables providing liquid such as water to a consumer equipment at a predetermined consumer pressure. Hence, the buffer can be placed above, below or vertically adjacent to a consumer equipment as it does not rely on gravity to provide water to the consumer equipment.

Further, as compared to buffers which use a pump for pumping liquid out of the buffer to the consumer equipment, the present design is more power and weight efficient. For example, a state of the art toilet rinsing in an aircraft lavatory is a typical application with pulsed flow with a flow rate of approximately 9 l/min for about 1.2 s. The theoretical minimum time between two toilet flushes is about 8 s. A water pump in a buffer needs to able to supply the flow rate of 9 l/min, i.e., roughly 0.18 l of water have to be supplied in 1.2 s. In contrast, in a buffer according to the disclosure herein, the water for a toilet flush is provided largely by the residual gas pressure in the storage volume of the buffer. Hence, the pressurizer can operate at a considerably lower flow rate. Depending on the implementation, it may, for example, be sufficient to have the gas pressure back at the operating pressure before the toilet rinsing can be operated a second time, i.e., in the above example after about 8 s. However, a pressurizer with reduced flow requirements means that the weight and power consumption can advantageously be reduced.

In a preferred embodiment, the storage volume is tightly separated by partition element into a liquid compartment for holding the liquid and a gas compartment for holding the gas. The two compartments thus define the respective parts of the storage volume inside a housing of the buffer which hold the liquid and the gas.

The use of a partition element is preferred since it clearly separates the gas from the liquid. Thus, no gas from the gas compartment can enter a distribution system for the liquid and no liquid may enter the pressurizer supplying the gas or ventilator. The partition element separates the gas compartment tightly from the liquid compartment, i.e., no liquid can flow through the partition element from the liquid compartment into the gas compartment and no gas can flow from the gas compartment through the partition element into the liquid compartment. Further, the membrane is flexible or movable so that the volume of one of the compartments can be increased by reducing the volume of the other compartment. The partition element can be formed, for example, by a bladder or balloon where the inside of the bladder forms one of the compartments and the other compartment is, for example, defined by the housing of the buffer and an outer surface of the bladder.

In case a partition element is used, it is preferably flexible to have about the same pressure across its interface with the gas and the liquid in the storage volume. Hence, when the pressure in the gas compartment is increased, the pressure in the liquid compartment also increases. Correspondingly, when the pressure in the liquid compartment is reduced, the pressure in the gas compartment is also reduced. Further, this also implies that when the amount or volume of liquid in the liquid compartment is reduced by draining liquid out of the liquid compartment, the pressure of gas in the gas compartment drops and so does the pressure of the liquid in the liquid compartment. On the other hand, when the liquid compartment is filled with liquid, the volume of the gas in the gas compartment is reduced and the pressure of the gas in the gas compartment rises which causes the pressure in the liquid compartment to rise.

In a preferred embodiment the buffer comprises a controller for operating the pressurizer and a pressure sensor arranged in the gas compartment and communicatively connected to the controller. The controller is configured for operating the pressurizer to increase the pressure in the gas compartment to the operating pressure when a pressure measured by the pressure sensor is below the operating pressure.

Hence, in the preferred embodiment a controller, for example, an integrated circuit such as a microcontroller, a microprocessor or an application specific integrated circuit (ASIC), is provided which controls operation of the pressurizer based on a signal received from a pressure sensor. The latter measures the gas pressure in the gas compartment of the buffer. When the pressure in the gas compartment drops below the operating pressure of, for example, 2.8 bar, or filling pressure of, for example, 2.5 bar, the controller activates the pressurizer which fills the gas compartment of the buffer with gas. The controller preferably also halts the filling of gas compartment by the pressurizer when the pressure sensor reports that the gas pressure has reached the operating pressure.

In a preferred embodiment, the pressurizer is a pump, in particular, a diaphragm pump. Diaphragm pumps are particularly preferred as they prevent backflow of gas from the gas compartment. An example diaphragm pump may provide a gas flow of approximately 1.7 l/min at 2.8 bar using less than 30 W power. Corresponding diaphragm pumps are commercially available and weigh less than 250 g.

In a preferred embodiment the ventilator is a pressure relieve valve adjusted to prevent the pressure in the gas compartment from exceeding the operating pressure. For example, the pressure relieve valve may be adjusted to open when the gas pressure exceeds 2.8 bar.

In an alternative preferred embodiment, the pressurizer and the ventilator are formed by the same device, i.e., it is conceivable to use the same pump to fill the gas compartment and to also remove gas from the gas compartment.

In a preferred embodiment the buffer is configured such that a rate at which liquid can be drained from the liquid compartment of the buffer exceeds a maximum gas supply rate at which gas can be supplied to the gas compartment of the buffer using the pressurizer such that when liquid is drained from the liquid compartment at a rate exceeding the maximum gas supply rate, the pressure of gas in the gas compartment drops below the operating pressure and can only be increased back to the operating pressure using the pressurizer when no more liquid is drained from the liquid compartment. A buffer according to the preferred embodiment is particularly advantageous as the pressurizer supplying gas to the gas compartment of the buffer does not need to provide an equivalent flow rate to a water pump which would achieve the same liquid flow rates. Thereby, the weight and power consumption of the device can be reduced.

In a second aspect, a water supply system for an aircraft is provided. The water supply system comprises a central water tank, a plurality of pieces of consumer equipment, a conduit system connecting the central water tank to the plurality of pieces of consumer equipment and at least one buffer according to any of the preceding embodiments, where the liquid is water and the gas is air.

At least one consumer equipment of the plurality of pieces of consumer equipment is associated with a buffer of the at least one buffer. The at least one buffer is configured to provide water to each associated consumer equipment at the consumer pressure. The water supply system further comprises a central pressurizer for feeding water from the central water tank to the liquid compartment of the at least one buffer at a pressure exceeding the consumer pressure.

The advantages of the water supply system correspond to the advantages of the embodiment of the buffer used therein.

In a further aspect, an aircraft comprising a water supply system according to the any of the preceding embodiments is provided. The advantages of the aircraft correspond to the advantages of the embodiment of the buffer used therein.

BRIEF DESCRIPTION OF THE DRAWINGS

Subsequently, the disclosure herein will be described in further detail with regards to the Figures, wherein.

DETAILED DESCRIPTION

Figure 1:
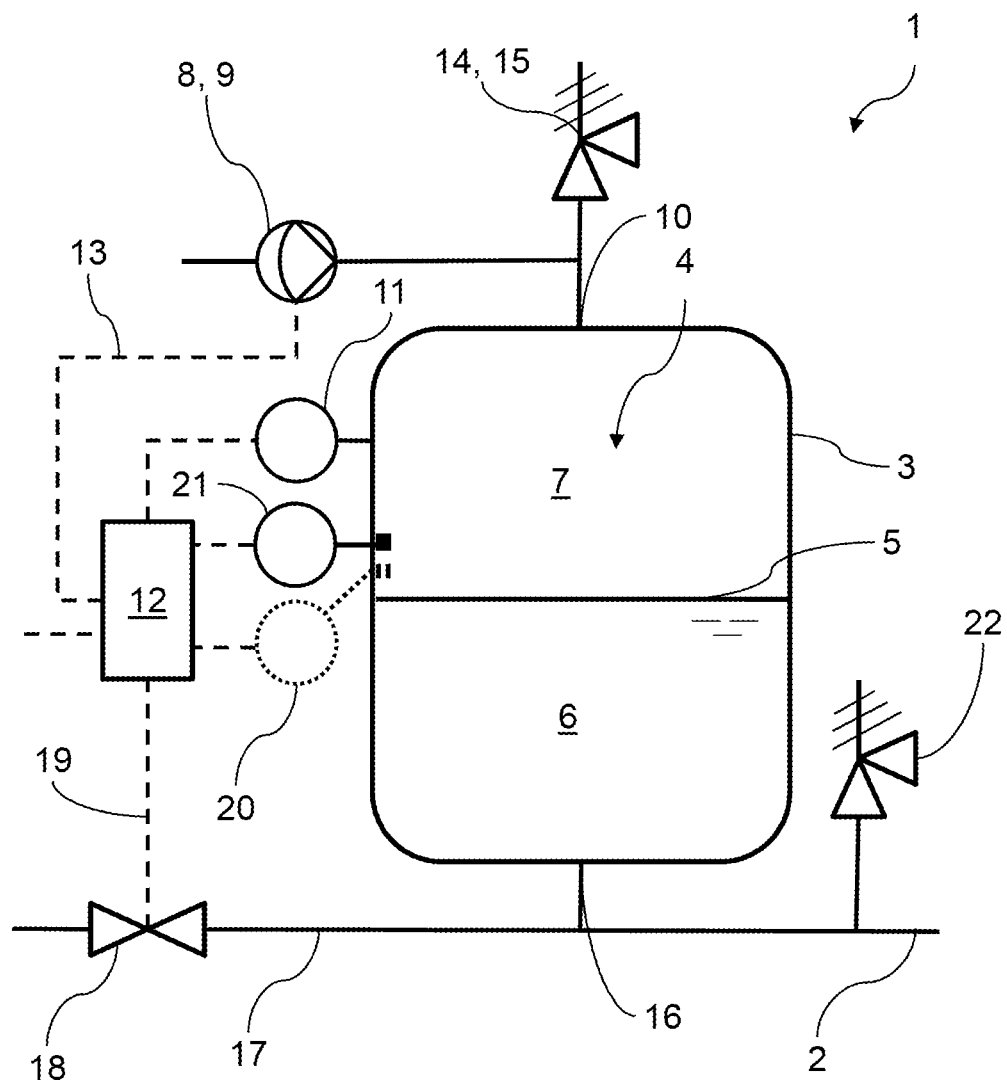
FIG. 1 shows a schematical drawing of an example embodiment of a buffer.

Throughout the figures like elements are designated with like reference numerals.

FIG. 1 shows an example embodiment of a buffer 1 for providing a liquid in the form of water at a consumer pressure to a consumer equipment. The consumer equipment itself is not shown in FIG. 1. However, a consumer supply line 2 connecting the buffer 1 to the consumer equipment is shown. The buffer 1 comprises a housing 3 defining a storage volume 4 for holding a liquid and a gas. In the example embodiment, the storage volume 4 is separated by a partition element 5 into a liquid compartment 6 which holds the water in the storage volume 4 and a gas compartment 7 for holding the air in the storage volume 4.

The partition element 5 seals the liquid compartment 6 from the gas compartment 7 thereby forming a barrier preventing water from entering the gas compartment 7. Likewise, gas is prevented from flowing from the gas compartment 7 to the liquid compartment 6. The partition element is further configured so that the volume of the liquid compartment 6 can be increased by reducing the volume of the gas compartment 7 and vice versa. Further, the pressure of the air in the gas compartment 7 and the pressure of the water in the liquid compartment 6 are positively correlated. Hence, when the pressure of the air in the gas compartment 7 rises, the pressure of the water in the liquid compartment 6 also rises. Since the pressure of the water in the liquid compartment 6 is positively correlated with the pressure of the air in the gas compartment 7, the air is held at an operating pressure in the gas compartment 7 when the water is held at the consumer pressure in the liquid compartment 6. The partition element 5 is formed from a flexible membrane so that the pressure of the gas along the membrane and the pressure of the water along the membrane are about equal.

Water shall be supplied from the buffer 1 at a consumer pressure which exceeds the environmental pressure. In case the buffer 1 is used onboard an aircraft, the environmental pressure corresponds to the cabin pressure. When the aircraft is on the ground and the cabin is vented, the cabin pressure corresponds to the atmospheric pressure. However, when the aircraft is in flight and the cabin is pressurized, the cabin pressure and, thus, the environmental pressure may be above the atmospheric pressure.

The buffer 1 further comprises a pressurizer 8 in form of a diaphragm pump 9. The pressurizer 8 is connected to the gas compartment 7 of the storage volume 4 via a gas opening 10 and can be operated to supply air to the gas compartment 7. In the example embodiment shown in FIG. 1, the diaphragm pump 9 can supply air at a flow rate of 1.7 l/min at a pressure of 2.8 bar to the storage volume 4. The power consumption of the diaphragm pump 9 is less than 30 W and it weighs less than 250 g. Using a diaphragm pump 9 as a pressurizer 8 has the advantage that it intrinsically prevents backflow of air from the gas compartment 7. The pressurizer 8 is used to supply air to the gas compartment 7 when water has been drained from the liquid compartment 6 to bring the pressure in the gas compartment 7 back to the operating pressure.

To this end, a gas pressure sensor 11 is part of the buffer 1 which measures the pressure of the air in the gas compartment 7 of the storage volume 4. The pressure sensor 11 is communicatively connected to a controller 12 which controls amongst others the operation of the pressurizer 8 via a control line 13. In the example embodiment shown in FIG. 1, the controller 12 is a microcontroller which is configured to read the values form the pressure sensor 11 and control the operation of the diaphragm pump 9. The controller 12 turns the diaphragm pump 9 on when the pressure in the gas compartment 7 as sensed by the pressure sensor 11 reaches a filling threshold which may, for example, be 0.3 bar below the operating pressure, i.e., when the operating pressure is at 2.8 bar, the filling threshold would be 2.5 bar. Hence, the diaphragm pump 9 is turned on by the controller 12 when the pressure measured by the pressure sensor 11 drops below 2.5 bar.

The controller 12 also turns the diaphragm pump 9 off when the pressure measured by the pressure sensor 11 in the gas compartment 7 of the buffer 1 reaches the operating pressure. Thus, in the embodiment shown in FIG. 1, the diaphragm pump 9 is turned off, when the pressure in the gas compartment 7 reaches 2.8 bar.

In order to release air from the gas compartment 7 of the buffer 1, a ventilator 14 in form of a relief valve 15 is provided. The relief valve 15 is also connected to the gas opening 10 of the storage volume 4 so that the buffer 1 in the example shown in FIG. 1 comprises only one opening for filling the gas compartment 7 with gas and removing gas therefrom. The relief valve 15 is configured to automatically open when the pressure in the gas compartment 7 exceeds the operating pressure of, for example, 2.8 bar. In the embodiment in FIG. 1 the relieve valve 15 is a passive device which opens automatically when the pressure in the gas compartment 7 exceeds the operating pressure and closes automatically when the pressure in the gas compartment 7 is at or below the operating pressure.

The buffer 1 further comprises a liquid opening 16 which is provided for supplying water to the liquid compartment 6 of the storage volume 4 and for removing water from the liquid compartment 6. Water is supplied to the liquid compartment 6 and, thus, to the storage volume from a central water tank which is not shown in FIG. 1. However, a line 17 connecting the buffer 1 to the central water tank is shown in FIG. 1. The line 17 is connected to the liquid opening 16 of the buffer 1 and comprises a fill valve 18 for controlling the supply of water from the central water tank.

Opening and closing of the fill valve 18 is also controlled by the controller 12. The controller 12 opens the fill valve 18, when water has been removed from the storage volume 4 for supplying water to a consumer equipment and closes the fill valve 18 when the liquid compartment 6 has been filled with water, for example, up to a maximum fill level. In the example embodiment shown in FIG. 1, two fill level sensors 20, 21 are provided. Both fill level sensors 20, 21 are communicatively connected to the controller 12. The latter is configured, for example, to close the fill valve 18 when the water level in the liquid compartment reaches the upper fill level sensor 21. The fill valve 18 may open when level is lower than the lower fill level sensor 20. A redundancy check included in the controller 12 verifies, for example, whether the lower level sensor 20 was also activated while the higher level sensor 21 gets active.

Finally, a protective release valve 22 is provided in the consumer supply line 2. The protective release valve 22 is configured such that it opens when a maximum operating pressure is exceeded. Thereby, the equipment is protected from damage caused by high water pressure which is in particularly useful if a high-pressure water supply system is used to supply water from the central water tank to the buffer 1.

The buffer 1 shown in FIG. 1 is operated as follows: when water is requested from a consumer equipment connected to the consumer supply line 2, for example, by opening a valve at the consumer equipment, water is pushed out of the storage volume 4 due to the pressurized gas in the gas compartment 7 of the storage volume 4 and thus supplied to the consumer equipment. When the water level in the storage volume 4 drops, the volume of the gas compartment 7 and, thus, the storage volume increases and the gas pressure drops. Once the pressure sensed by the pressure sensor 11 drops below the filling threshold, the controller 12 activates the pressurizer 8 which supplies air to the gas compartment to increase the gas pressure. When the pressure in the gas compartment reaches the operating pressure, the pressurizer 8 is shut off by the controller 12.

In case the consumer equipment is, for example, a toilet in an aircraft lavatory, the water flow to be provided by the buffer 1 is pulsed. For example, a state of the art toilet rising takes up water at a flow rate of approximately 9 l/min for about 1.2 s. Subsequent toilet flushes are separated by at least 8 s. Thus, the flow that needs to be provided by the buffer 1 is highly pulsed. Since the residual gas pressure in the gas compartment 7 of the buffer 1 is preferably sufficient to provide water for several toilet flushes, the pressurizer 8 does not have to supply the gas with the same flow at which water is removed from the buffer 1. Hence, as compared to a pump provided in a buffer which provides water from the buffer 1, the pressurizer 8 takes up less power and weighs less.

Figure 2:
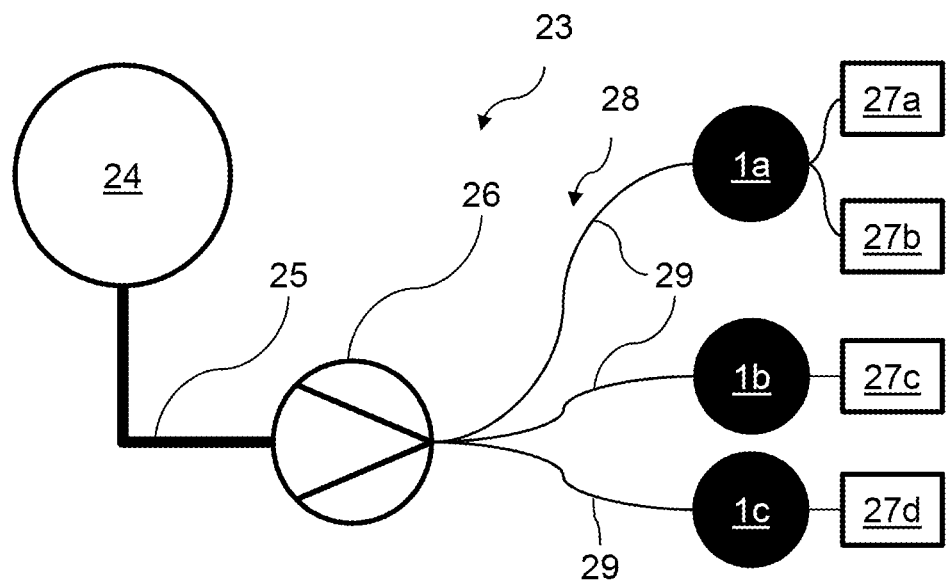
FIG. 2 shows a schematical drawing of an example embodiment of a water supply system comprising an example embodiment of a buffer.

FIG. 2 shows a schematic drawing of an example embodiment of a water supply system 23 for an aircraft. The water supply system 23 comprises a central water tank 24 which is connected via low-pressure plumbing 25 to a high-pressure water pump 26 which provides water from the central water tank 24 to various pieces of consumer equipment 27a to 27d via a high-pressure conduit system 28. The pieces of consumer equipment 27a to 27d are collectively referred to as consumer equipment 27. Each consumer equipment 27a to 27d is associated with a buffer 1a to 1c as shown in FIG. 1. The buffers 1a to 1c are collectively identified using the reference numeral 1. The consumer equipment 27a is a toilet rinsing which is arranged in the same lavatory (not shown) as a sink forming the consumer equipment 27b. The two pieces of consumer equipment 27a, 27b arranged in the same lavatory are supplied by the same buffer 1a. The other two pieces of consumer equipment 27c, 27d, a sink in a galley and steam oven, are supplied from individual buffers 1b and 1c. With regard to the details of the buffers 1a to 1c reference is made to FIG. 1 and the corresponding description.

The high-pressure water supply conduit system 28 is made-up from flexible conduits 29 made from a plastic material with an internal diameter of, for example, 4-6 mm. The buffers 1a to 1c store the water at a consumer pressure of, for example, 2.8 bar at which the water can be directly supplied to the consumer equipment 27a to 27d.

Figure 3:
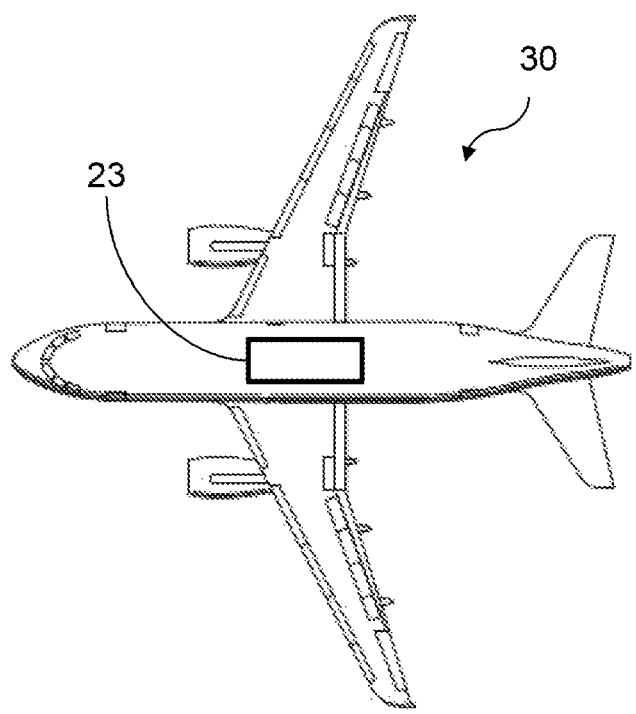
FIG. 3 shows a schematical drawing of an example embodiment of an aircraft with an example embodiment of a water supply system comprising an example embodiment of a buffer.

Finally, FIG. 3 shows an example embodiment of an aircraft 30 with an example embodiment of a water supply system 23 as shown in FIG. 2. With regard to the details of the water supply system 23, reference is made to FIG. 2 and the corresponding parts of the description.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A buffer for storing liquid at a predetermined consumer pressure exceeding an environmental pressure comprising: a storage volume for holding the liquid and a gas;
   a pressure sensor in communication with the storage volume;
   one or more level sensor in communication with the storage volume;
   a fill valve configured for controlling a supply of liquid to the liquid compartment;
   a pressurizer configured for increasing a pressure of the gas in the storage volume to a predetermined operating pressure that is correlated to the liquid being at the consumer pressure or maintaining the pressure of the gas in the storage volume at the operating pressure when liquid is or has been drained from the storage volume so that the pressure of liquid in the storage volume is increased to the consumer pressure; a ventilator configured for reducing the pressure of the gas in the storage volume back to the operating pressure or maintaining the pressure of the gas in the storage volume at the operating pressure when the storage volume is filled with liquid so that the pressure of the liquid in the storage volume is reduced to the consumer pressure; and
   a controller communicatively connected to the pressure sensor and the pressurizer;
   wherein the controller is configured for operating the pressurizer to increase the pressure of the gas in the storage volume to the operating pressure when a pressure measured by the pressure sensor is below the operating pressure;
   wherein the controller is configured for operating the fill valve to fill the storage volume with liquid when a liquid level measured by the one or more level sensor is below a minimum fill level; and
   wherein the storage volume is tightly separated by a partition element into a liquid compartment for holding the liquid and a gas compartment for holding the gas, wherein the partition element is configured such that a volume of the liquid compartment can be increased by reducing a volume of the gas compartment and vice versa.

2. The buffer according to claim 1, wherein the partition element is a membrane or diaphragm.

3. The buffer according to claim 1, wherein the buffer comprises a controller for operating the pressurizer and a pressure sensor is arranged in the gas compartment and communicatively connected to the controller, wherein the controller is configured for operating the pressurizer to increase the pressure in the gas compartment to the operating pressure when a pressure measured by the pressure sensor is below the operating pressure.

4. The buffer according to claim 1, wherein the pressurizer is a pump or a diaphragm pump.

5. The buffer according to claim 1, wherein the ventilator is a pressure relieve valve adjusted to prevent the pressure in the gas compartment from exceeding the operating pressure.

6. The buffer according to claim 1, wherein the pressurizer and the ventilator are formed by a same device.

7. The buffer according to claim 1, where the gas is air, and the liquid is water.

8. A water supply system for an aircraft comprising:
a central water tank;
a plurality of pieces of consumer equipment;
a conduit system connecting the central water tank to the plurality of pieces of consumer equipment;
at least one buffer according to claim 1, wherein at least one piece of consumer equipment of the plurality of pieces of consumer equipment is associated with a buffer of the at least one buffer and wherein the at least one buffer is configured to provide water to each associated consumer equipment at the consumer pressure; and
a central pressurizer for feeding water from the central water tank to the liquid compartment of the at least one buffer at a pressure exceeding the consumer pressure.

9. An aircraft comprising a water supply system according to claim 8.

10. A buffer for storing liquid at a consumer pressure exceeding an environmental pressure comprising:
a storage volume for holding the liquid and a gas;
a pressurizer configured for increasing a pressure of the gas in the storage volume to an operating pressure or maintaining the pressure of the gas in the storage volume at the operating pressure when liquid is or has been drained from the storage volume so that the pressure of liquid in the storage volume is increased to the consumer pressure; and
a ventilator configured for reducing the pressure of the gas in the storage volume back to the operating pressure or maintaining the pressure of the gas in the storage volume at the operating pressure when the storage volume is filled with liquid so that the pressure of the liquid in the storage volume is reduced to the consumer pressure;
wherein the buffer is configured such that a rate at which liquid can be drained from the liquid compartment of the buffer exceeds a maximum gas supply rate at which gas can be supplied to the gas compartment using the pressurizer such that when liquid is drained from the liquid compartment at a rate exceeding the maximum gas supply rate, the pressure of gas in the gas compartment drops below the operating pressure and can only be increased back to the operating pressure using the pressurizer when no more liquid is drained from the liquid compartment.

* * * * *